United States Patent
Giles et al.

(10) Patent No.: US 8,125,984 B2
(45) Date of Patent: Feb. 28, 2012

(54) METHOD, SYSTEM, AND COMPUTER PROGRAM PRODUCT FOR IMPLEMENTING STREAM PROCESSING USING A RECONFIGURABLE OPTICAL SWITCH

(75) Inventors: James R. Giles, Yorktown Heights, NY (US); Nagui Halim, Yorktown Heights, NY (US); Kirsten W. Hildrum, Hawthorne, NY (US); Daniel M. Kuchta, Patterson, NY (US); Yoonho Park, Chappaqua, NY (US); Deepak Rajan, Fishkill, NY (US); Laurent Schares, Sleepy Hollow, NY (US); Eugen Schenfeld, South Brunswick, NJ (US); Phillippe L. Selo, Tarrytown, NY (US); Marc Taubenblatt, Pleasantville, NY (US); Rohit Wagle, Elmsford, NY (US); Joel L. Wolf, Katonah, NY (US); Xiaolan J. Zhang, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 440 days.

(21) Appl. No.: 12/052,814

(22) Filed: Mar. 21, 2008

(65) Prior Publication Data
US 2009/0238178 A1 Sep. 24, 2009

(51) Int. Cl.
*H04L 12/66* (2006.01)
(52) U.S. Cl. .......... 370/353; 370/401; 398/82; 398/111
(58) Field of Classification Search .................. 370/329, 370/352, 353, 360, 357; 709/224, 242; 398/2, 398/48
See application file for complete search history.

(56) References Cited

U.S. PATENT DOCUMENTS
6,671,254 B1 12/2003 Nakahira
(Continued)

FOREIGN PATENT DOCUMENTS
EP 0568402 B1 1/1999
(Continued)

OTHER PUBLICATIONS

William J. Daly, et al., Merrimac: Supercomputing with Streams, SC'03, Nov. 15-21, 2003, Phoenix, Arizona, Copyright 2003 ACM, 8 pages.
U.S. Appl. No. 12/193,125, filed Aug. 18, 2008.
Charu C. Aggarwal et al., Challenges and Experience in Prototyping a Multi-Modal Stream Analytic and Monitoring Application on System S, VLDB, Sep. 23-28, 2007, Vienna, Austria.
(Continued)

*Primary Examiner* — Hassan Kizou
*Assistant Examiner* — Emmanuel Maglo
(74) *Attorney, Agent, or Firm* — Cantor Colburn LLP; William J. Stock

(57) ABSTRACT

A method, system, and computer program product for implementing stream processing are provided. The system includes an application framework and applications containing dataflow graphs managed by the application framework running on a first network. The system also includes at least one circuit switch in the first network having a configuration that is controlled by the application framework, a plurality of processing nodes interconnected by the first network over one of wireline and wireless links, and a second network for providing at least one of control and additional data transfer over the first network. The application framework reconfigures circuit switches in response to monitoring aspects of the applications and the first network.

24 Claims, 6 Drawing Sheets

U.S. PATENT DOCUMENTS

| | | | |
|---|---|---|---|
| 6,748,174 B2 | 6/2004 | Milton et al. | |
| 6,792,174 B1 | 9/2004 | Ramaswami | |
| 6,809,734 B2 | 10/2004 | Suzuoki et al. | |
| 6,850,989 B1* | 2/2005 | Lavian et al. | 709/242 |
| 7,000,022 B2 | 2/2006 | Lisitsa et al. | |
| 7,263,096 B2* | 8/2007 | Yang et al. | 370/353 |
| 7,441,224 B2 | 10/2008 | Bellas et al. | |
| 7,620,323 B2* | 11/2009 | Strasser et al. | 398/50 |
| 2002/0131103 A1* | 9/2002 | Bambos | 359/118 |
| 2004/0052527 A1 | 3/2004 | Kirby | |
| 2004/0131308 A1 | 7/2004 | Mao et al. | |
| 2005/0105905 A1 | 5/2005 | Ovadia et al. | |
| 2007/0043742 A1 | 2/2007 | Arguello et al. | |
| 2007/0198971 A1* | 8/2007 | Dasu et al. | 717/140 |
| 2007/0204020 A1 | 8/2007 | Anderson et al. | |
| 2007/0211280 A1 | 9/2007 | Bansal et al. | |
| 2007/0214458 A1 | 9/2007 | Bansal et al. | |
| 2008/0025288 A1 | 1/2008 | Benner et al. | |
| 2008/0250390 A1* | 10/2008 | Feblowitz et al. | 717/114 |
| 2009/0119238 A1 | 5/2009 | Amini et al. | |
| 2009/0238178 A1 | 9/2009 | Giles et al. | |

FOREIGN PATENT DOCUMENTS

| | | |
|---|---|---|
| JP | 2006113566 | 4/2006 |
| WO | WO0186998 A1 | 11/2001 |

OTHER PUBLICATIONS

International Search Report; International Application No. PCT/EP2009/060483; International Filing Date: Aug. 13, 2009; Date of Mailing: Oct. 19, 2009; 11 pages.

U.S. Appl. No. 11/374,192, filed Mar. 13, 2006.

U.S. Appl. No. 11/840,556, filed Aug. 17, 2007.

U.S. Appl. No. 12/052,836, filed Mar. 21, 2008.

Henrique Andrade et al., SPADE: The System S Declarative Stream Processing Engine, SIGMOD, Jun. 9-12, 2008, pp. 1123-1134, Vancouver, BC, Canada.

S.P. Chang et al., A Reconfigurable Interconnect Fabric With Optical Circuit Switch and Software Optimizer for Stream Computing Systems, Optical Society of America, May 29, 2009; pp. 1-3.

Kevin J. Barker et al.; On the Feasibility of Optical Circuit Switching for High Performance Computing Systems, Conference on High Performance Networking and Computing, Proceedings of the 2005 ACM/IEEE Conference on Super Computing; 22 pages; Nov. 12-18, 2005.

Lisa Amini et al.; "Adaptive Control of Extreme-scale Stream Processing Systems, Proceedings of the 26th IEEE International Conference on Distributed Computing Systems"; Jul. 24, 2006; pp. 1-7.

* cited by examiner

METHOD, SYSTEM, AND COMPUTER PROGRAM PRODUCT FOR IMPLEMENTING STREAM PROCESSING USING A RECONFIGURABLE OPTICAL SWITCH

STATEMENT REGARDING FEDERALLY SPONSORED RESEARCH AND DEVELOPMENT

The invention disclosed herein was made with U.S. Government support under Contract No. H98230-07-C-0383 awarded by the U.S. Department of Defense. The Government has certain rights in this invention.

BACKGROUND OF THE INVENTION

The present invention relates generally to operating systems and highly available fault tolerant systems. More particularly, this invention relates to application frameworks deploying applications with dataflow graphs on networks containing circuit switches where such switches are controlled by the application framework.

Evolving data workloads, such as stream processing workflows, require new types of interconnects because traditional packet switching is expensive in terms of energy use and is not generally flexible enough to dynamically adapt routing to the data requirements. Electrical packet switches at the center of compute clusters are hard to scale at high data rates, and high port counts require large numbers of parallel switch chips and multi-stage architectures. The need for lower-cost and more flexible interconnects is particularly important in High Performance Computing (HPC) systems. Electrical Circuit Switches (ECS) and Optical Circuit Switches (OCS) have been generally used in reconfigurable networks by the telecommunication industry for statically configured network routes. Both ECS and OCS may provide better power efficiency and allow lower latency through the switch than packet switches. The OCS switch is able to set up a dedicated connection dynamically between any pair of input and output ports. Each port is exclusively used in one connection, and, once configured, the network packets do not have to be inspected by the switch as they pass through. Different connections schemes between input/output pairs creates a unique network topology for the nodes that connect to each switch port, where nodes are typically the network endpoints, normally doing computational tasks on data in the workloads.

Stream processing applications are typically long running. In distributed streaming systems, such as that described in a paper entitled, *Adaptive Control of Extreme-scale Stream Processing System*, L. Amini, N. Jain, A. Sehgal, J Silber, and O. Verscheure (November 2005), streaming applications are deployed in the system and stream connections are established at runtime. The processing elements (PE) in the applications may, depending on their purpose, become CPU intensive, bandwidth intensive, and/or memory intensive. The streaming system determines the placement of these PEs based on available resources and the requirements of the PEs. The resource availability and requirements, however, can change over time. The node on which a PE is placed may not be suitable or optimal for the PE after a time. The system reacts by moving the PE to another node based on the current resource state. This may not be sufficient in some cases, including when a PE cannot be moved for some reason, or when moving the PE has more associated costs than the system is able to accept.

Circuit switched networks not only provide higher bandwidth between nodes but also the flexibility to reconfigure network resources instead of moving PEs. Traditionally, circuit switching technology has been used in wide area networks to provide a dedicated bandwidth connection between a source and destination.

Optical circuit switch (OCS) networks may offer a more scalable alternative to cluster interconnection networks. Benefits of OCS include transparency to data rates and protocols, low power consumption, compatibility with wavelength division multiplexing, and the fact that no need for optical-to-electrical and electrical-to-optical conversions are required.

The optical switch connects the optical fiber ports on the electronic packet switch of each cluster. Switching fibers connecting to different cluster switch ports form a unique inter-cluster all optical network. Optical switches may also be connected directly onto a node in a cluster for finer granularity.

Recent HPC literature has described network topologies that are amenable to evolving data workloads, such as stream processing (see, for example, a paper entitled, *On the Feasibility of Optical Circuit Switching for High Performance Computing Systems*, Barker, K. J.; Benner, A.; Hoare, R.; Hoisie, A.; Jones, A. K.; Kerbyson, D. K.; Li, D.; Melhem, R.; Rajamony, R.; Schenfeld, E.; Shao, S.; Stunkel, C.; Walker, P. Supercomputing, 2005). Proceedings of the ACM/IEEE SC 2005 Conference describe a network topology that combines the flexibility and other advantages of Optical Circuit Switches described above, with an aggregation scheme whereby several nodes are connected to one of several Electrical Packet Switches, and each Electrical Packet Switch is connected to the Optical Circuit Switch. The Optical Circuit Switch can be dynamically reconfigured as bandwidth needs evolve to connect one or more ports of each Electrical Packet Switch to one or more ports on other Electrical Packet Switches. In this way, data can be sent from a node, aggregated with traffic from other nodes at their packet switch, routed through the Optical Circuit Switch (which is dynamically configured to connect packets switches together needing the highest bandwidth), routed through the target Electrical Packet Switch, and then demultiplexed to target nodes. However, the technique described in the above-referenced paper for routing through the reconfigurable network to maximize network utilization is dependent on the development of new communication protocols. There is no method for existing network protocols, such as TCP/IP.

U.S. Pat. No. 6,792,174B1, entitled "METHOD AND APPARATUS FOR SIGNALING BETWEEN AN OPTICAL CROSS-CONNECT SWITCH AND ATTACHED NETWORK EQUIPMENT," describes a method for using and controlling Optical Switches in a network. Another patent application, entitled "DUAL NETWORK TYPES SOLUTION FOR COMPUTER INTERCONNECTS," U.S. Patent Publication No. 2008/0025288, filed on Jul. 27, 2006, describes the use of different network types including circuit switches and packet switches together in a system connecting a set of clusters and nodes. To date, however, there is no known solution for controlling circuit switches in a network, by application frameworks (that are running in the network) and utilizing them for running applications.

U.S. Pat. No. 6,671,254B1, entitled "COMMUNICATION NETWORK AND COMMUNICATION NODE USED IN SUCH NETWORK," and which issued on Dec. 30, 2003, describes a network comprising nodes with an optical cross connect and a packet switch on each node, together with network management based on traffic monitoring. However, there is no application framework for network management, which is specifically based on hardware packet flow monitoring executed on each node.

SUMMARY OF THE INVENTION

Exemplary embodiments of the invention include a system for implementing stream processing. The system includes an application framework and applications containing dataflow graphs managed by the application framework running on a first network. The system also includes at least one circuit switch in the first network having a configuration that is controlled by the application framework, a plurality of processing nodes interconnected by the first network over one of wireline and wireless links, and a second network for providing at least one of control and additional data transfer over the first network. The application framework reconfigures circuit switches in response to monitoring aspects of the applications and the first network Additional exemplary embodiments include a method for implementing stream processing. The method includes managing a configuration at least one circuit switch in a first network, the configuration managed by an application framework. The application framework and applications contain dataflow graphs that are managed by the application framework running on a first network. The method also includes receiving, by a second network, at least one of control and additional data transfer over the first network. The first network includes processing nodes interconnected by the first network over one of wireline and wireless links. The method further includes monitoring aspects of the applications and the first network, and reconfiguring circuit switches by the application framework in response to the monitoring.

Further exemplary embodiments include a computer program product for implementing stream processing. The computer program product includes a storage medium readable by a computer processor and storing instructions for execution by the computer processor for implementing a method. The method includes managing a configuration at least one circuit switch in a first network, the configuration managed by an application framework. The application framework and applications contain dataflow graphs that are managed by the application framework running on a first network. The method also includes receiving, by a second network, at least one of control and additional data transfer over the first network. The first network includes processing nodes interconnected by the first network over one of wireline and wireless links. The method further includes monitoring aspects of the applications and the first network, and reconfiguring circuit switches by the application framework in response to the monitoring.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the exemplary embodiments of the invention, together with advantages and features, by way of example with reference to the drawings.

DETAILED DESCRIPTION

A stream processing computer network implementing a reconfigurable optical circuit switch, and method therefore, are provided in accordance with exemplary embodiments of the invention. The stream processing computer system controls one or more circuit switches that are present in the network. The streaming system receives input about various aspects of the applications running in the network and about the status of the network itself. Using this information, the system determines what type of network configuration suits the running applications, as well as the placements of the processing elements (PEs) in those applications.

The stream processing computer system continuously or periodically reviews the application location allocations as well as the network configuration. Whenever new work arrives or the nature of the resources changes (e.g., new bottlenecks, changing stream requirements, and so on), the system adjusts by reconfiguring the network and relocating PEs to achieve better performance. If multiple network choices are available (such as multiple circuit switched and/or packet switched network components, e.g., switches, nodes), the system can choose one or more of these networks (and components) to route the streams. The choice of network/components and its configuration can be made at runtime.

Figure 1:
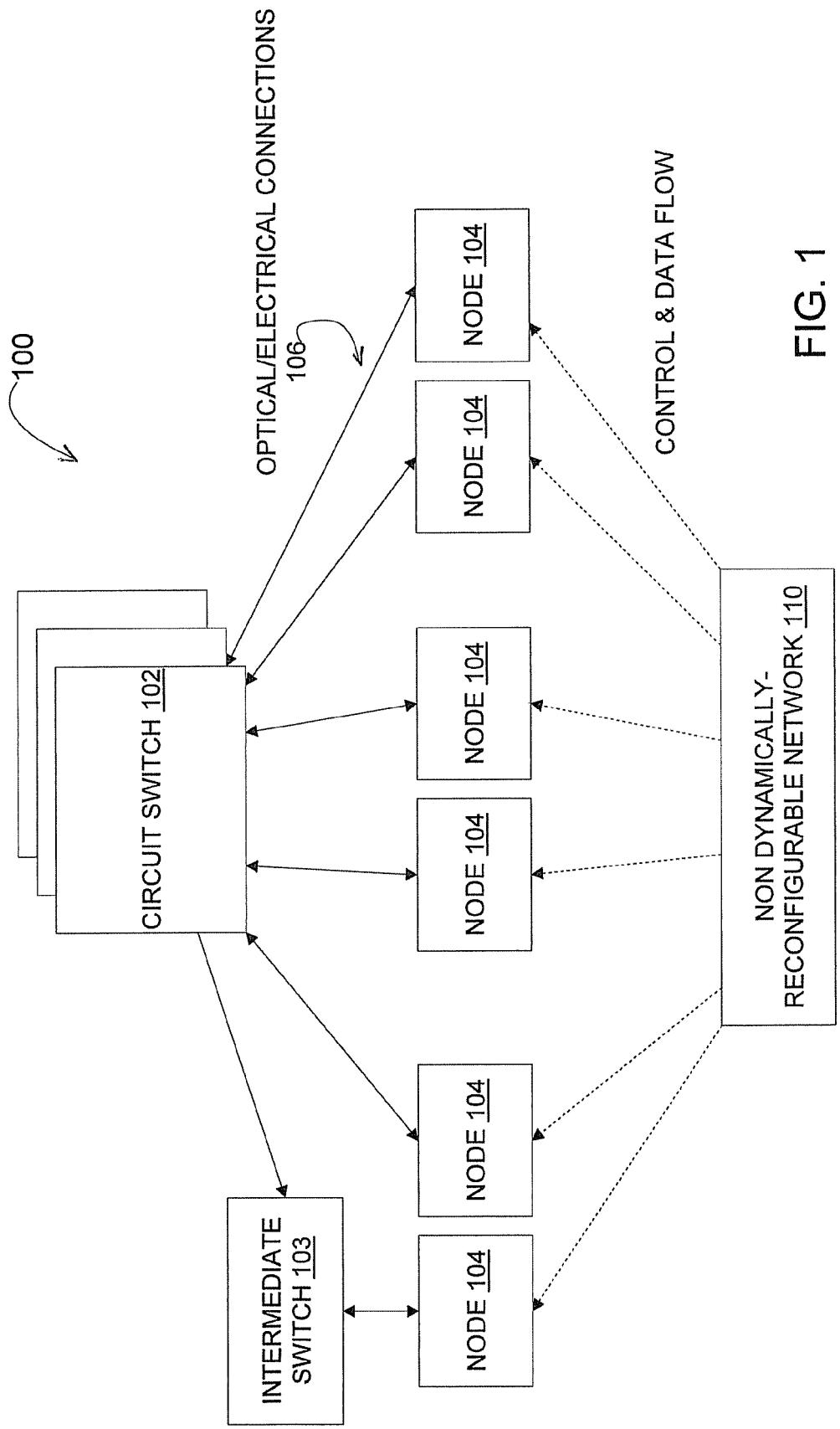
FIG. 1 is a block diagram of a stream processing computer network implementing a reconfigurable optical circuit switch in an exemplary embodiment.

Turning now to FIG. 1, an exemplary stream processing computer network system 100 contains one or more optical circuit switches 102. A secondary network 110, which may or may not be reconfigurable, is provided so that control data can be routed to all switches (e.g., switches 102) and nodes (e.g., nodes 104) in the network 100. This secondary network 110 may or may not be used to carry information traffic. The optical circuit switches 102 may either be connected directly to the processing nodes 104 or indirectly via an intermediate switch (e.g., intermediate switch 103). At least one of the nodes 104 is used to host applications processing high bandwidth streaming data. One or more nodes 104 can be connected to the OCS 102 by the same intermediate switch 103. Several such switches 103 may be used to connect groups of nodes 104 to the OCS 102 system. Each switch 103 may be connected to the OCS 102 with one or more optical links 106. The links 106 between the intermediate switch 103 and the OCS 102, as well as those between the OCS 102 and nodes 104, may be wireline, wireless, or a combination thereof.

It should also be noted that the OCS 102 system may or may not connect directly or indirectly to all processing nodes 104 in the network 100. Rather, an exemplary application framework discovers which nodes 104 have the OCS capability and can use these nodes appropriately. For purposes of illustration, all nodes 104 in the network 100 are shown to be directly or indirectly connected to the OCS 102. The application framework manages applications running on the network 100, which contain e.g., data flow graphs.

Figure 2:
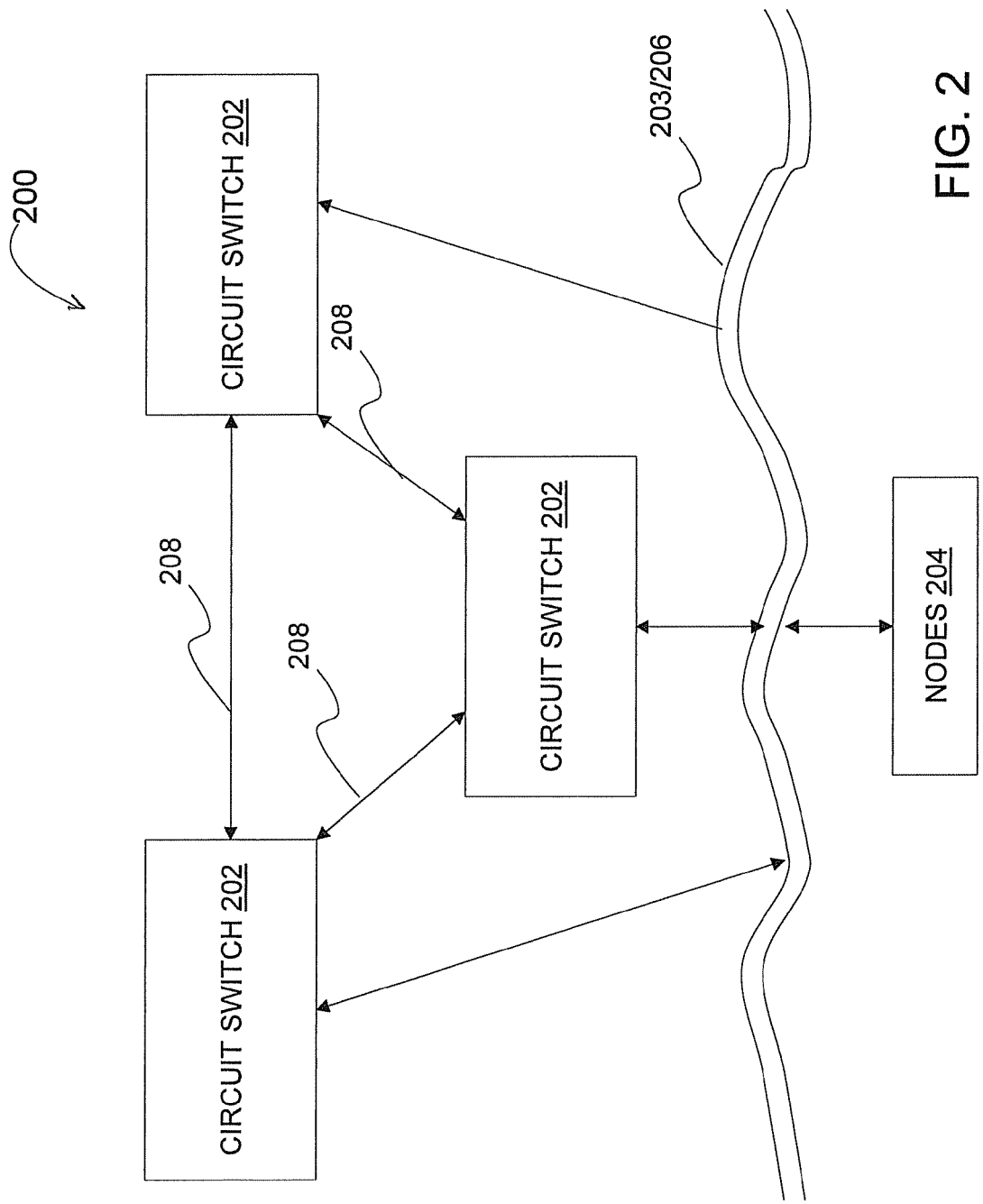
FIG. 2 is a block diagram illustrating a stream processing computer network implementing multiple optical circuit switches that are interconnected in accordance with an exemplary embodiment.
Figure 3:
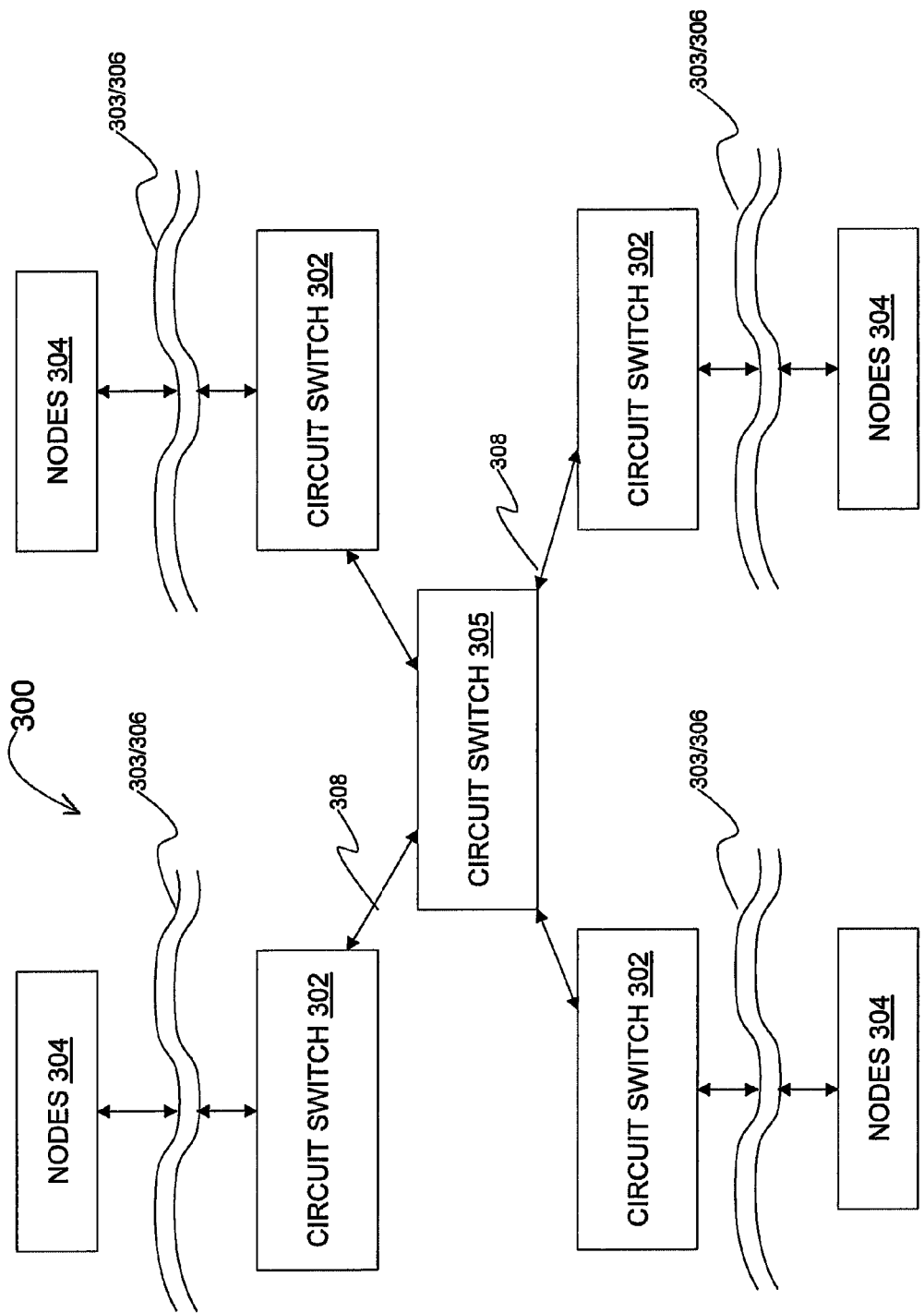
FIG. 3 is a block diagram illustrating a stream processing computer network implementing multiple optical circuit switches that are interconnected via a dedicated optical switch in an exemplary embodiment.
Figure 4:
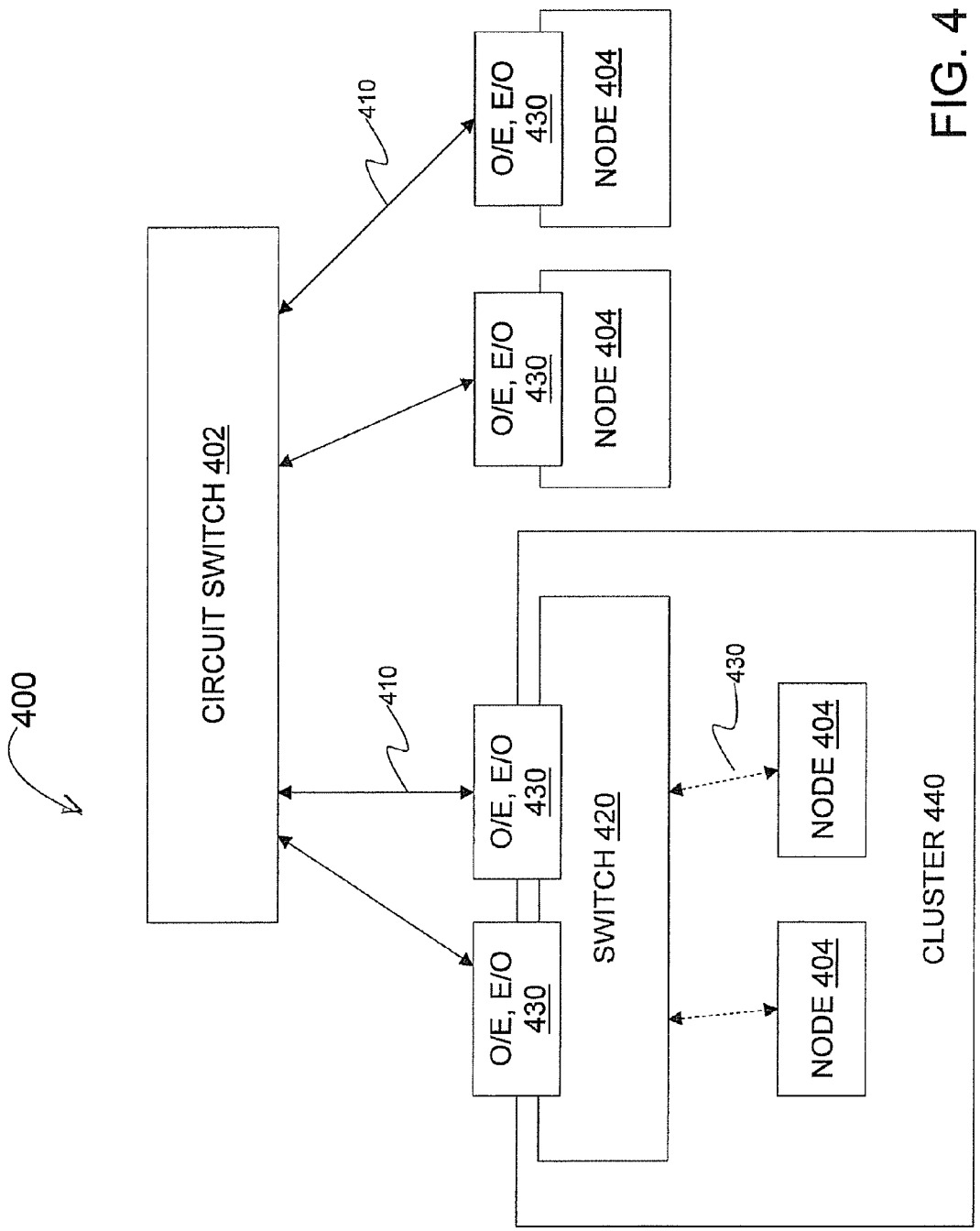
FIG. 4 is a block diagram of a stream processing computer network illustrating connections from an optical circuit switch to processing nodes.

FIGS. 2-4 illustrate alternative embodiments of the network 100 of FIG. 1. Components illustrated in FIGS. 2-4, which are substantially similar to those described in FIG. 1 will not be described in further detail. It will be understood that the illustrative embodiments depicted in FIGS. 2-4 are a small representative of the many types of configurations possible and are not to be construed as limiting in scope.

Turning now to FIG. 2, an alternative exemplary stream processing computer network system 200 contains one or more optical circuit switches 202. The switches 202 may be used independently to connect the same or different sets of nodes 204. Connections 208 may exist in between the switches 202 themselves, which in turn, allow one or more nodes 204 connected to one OCS 202 to connect to one or more nodes 204 on another OCS 202. Direct/indirect connections (e.g., optical/electrical connections 206 and/or intermediate switches 203) connect the switches 202 to the nodes 204.

Turning now to FIG. 3, a further embodiment illustrates a network system 300 having switches 302 connected in a different fashion. One or more optical circuit switches 302 are connected to each other via another optical circuit switch 305. Any number of optical links 308 may be used to connect the optical circuit switches 302/305 to one another. The switches 302 may be connected to nodes 304 via direct/indirect connections 303/306 as described above with reference to FIGS. 1 and 2.

FIG. 4 illustrates a stream processing computer network 400 in which two different means by which an optical switch 402 may be connected to nodes 404 are provided. One way is to have an electronic packet switch (EPS) or electronic circuit switch (ECS) 420 with optical transceivers 430 connected to the OCS 402 using fiber optical connections 410. The EPS/ECS is connected to one or more processing nodes 404 in a cluster 440 of nodes 404. The switch 420 may have one or more optical links 410 connected to one OCS 402. Another method is to connect the switch 402 directly to a node 404 with optical transceivers 430 using fiber optical connections 410.

Figure 5:
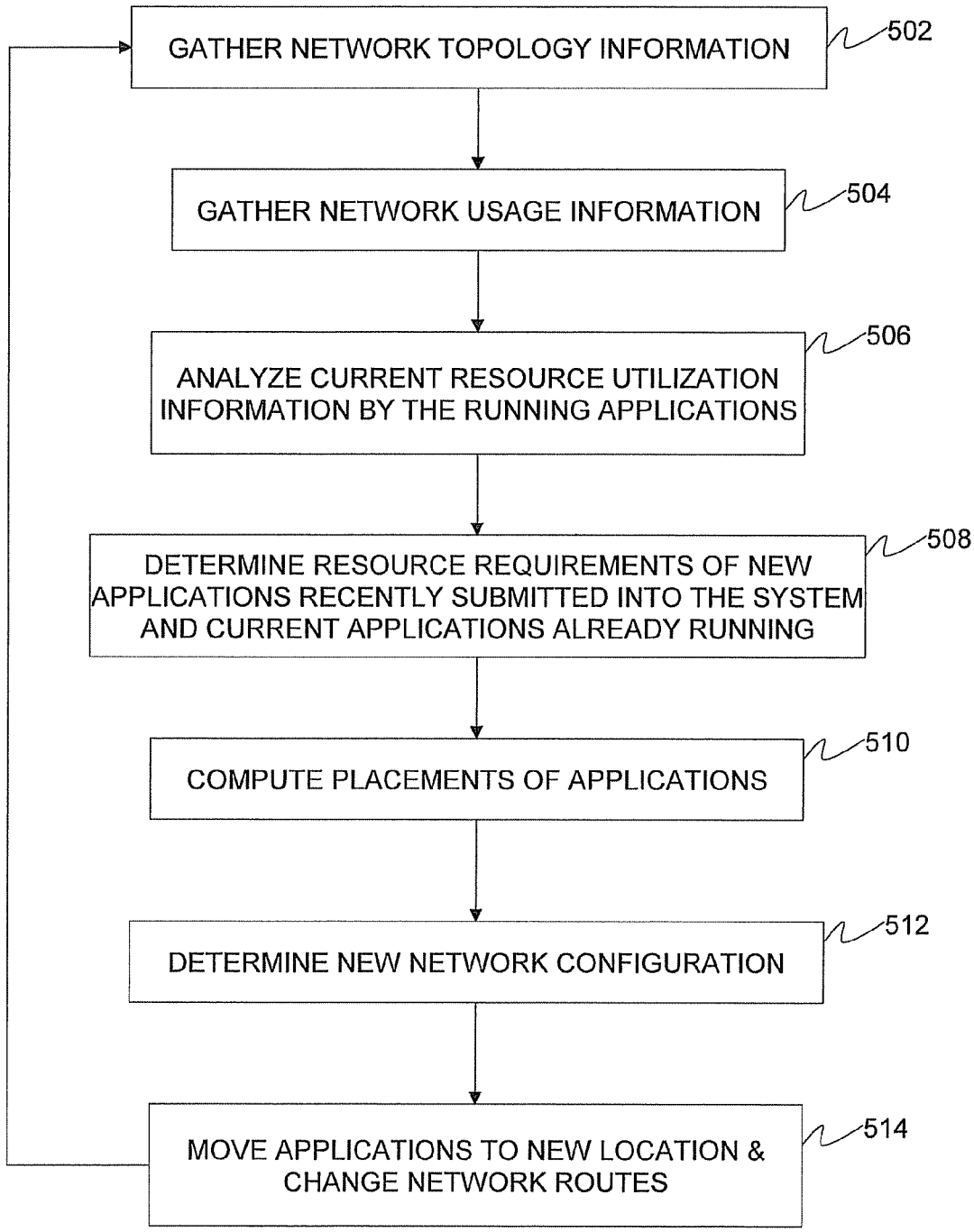
FIG. 5 is a flow diagram describing a process for implementing stream processing via reconfigurable optical circuit switch in accordance with an exemplary embodiment.

Turning now to FIG. 5, an exemplary process (also referred to herein as the application framework) for implementing stream processing via a reconfigurable optical circuit switch network (e.g., one of networks 100, 200, 300, and 400) will now be described in an exemplary embodiment. The process may be implemented, e.g., via one or more components operating on one or more of the nodes 104, 204, 304, and 404. A sample system including logical components for implementing the exemplary embodiments is shown and described in FIG. 6. The nodes may include processors that implement logic for performing the processes described herein. The process continually or periodically gathers network topology and node information in block 502. This information may be static or dynamic in nature. Static information includes, but is not limited to, data on the number of processors on the node, memory, and the non-reconfigurable network topology. Dynamic information includes, but is not limited to, the CPU load and memory usage in block 504. Information on network connections, latency, power consumptions, etc., may also be gathered. A small sampling of the attributes of each node that are tracked by the framework includes CPU information, memory information, and interface information (e.g., bandwidth information, drivers, connection information, address, and latency).

The framework also tracks the application resource usage information in block 506. This information includes data on the amount of CPU cycles each PE is using and the bandwidth consumed by each stream that PEs generate or consume (data flow rates). At block 508, resource requirements of new applications recently submitted into the system, and current applications already running, are determined.

Based on all gathered information, the framework optimizer, or scheduler, determines the best application placement and switch configurations in blocks 510 and 512. The optimization result provides information, such as: PE to node allocation, stream routing information, and reconfigured network topology information (e.g., cluster to cluster connections, cluster to node connections, node to node connections, etc.). New node allocations are provided for each PE. New network topology information is provided for the reconfigurable network(s). For each stream in the system, the route that the stream takes through the network is also provided.

Applications are moved from their initial location to their designated nodes in block 514. Applications that are already running and are not being relocated may need to have their routes reconfigured. Streams that have no direct OCS route from source to destination may take multi-hop routes. This means that, there may be one or more ECS/EPS between the source and destination. This is because when switching from one network configuration to another, routes of several existing applications may also be affected. The system can handle this in several ways. A temporary connection may be set up for short period of time to handle the streams, or the streams may be moved temporarily to a non-reconfigurable network. These details are orthogonal to the present invention.

The switch reconfiguration and stream routing changes can take place in parallel (with some degree of synchronization). Once the new routes and topology are in effect, functional, and the system can begin the entire process again from block 514 back to block 502.

Figure 6:
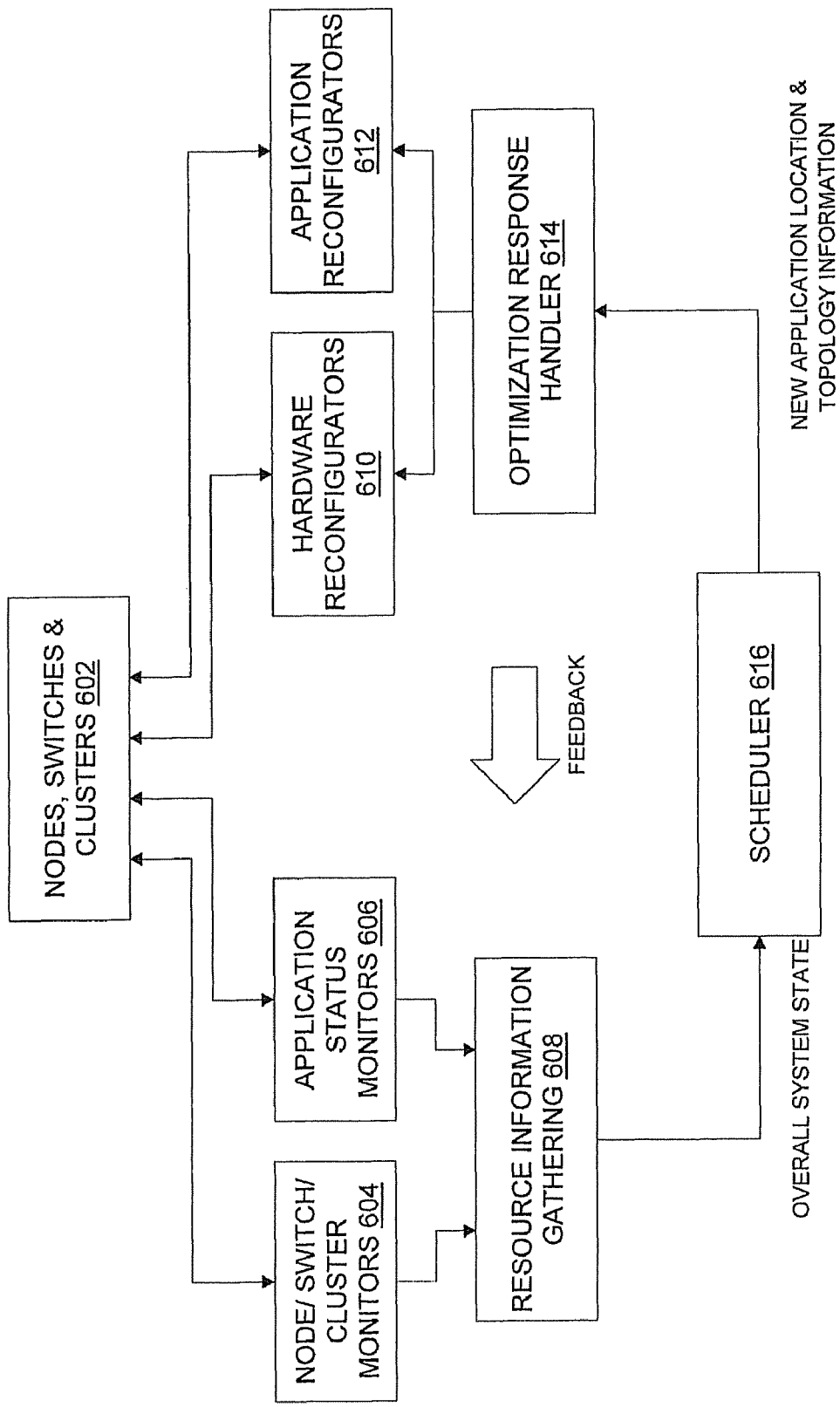
FIG. 6 is a block diagram illustrating logical components of the stream processing computer network in accordance with an exemplary embodiment.

Turning now to FIG. 6, a block diagram illustrating logical components of the stream processing computer network will now be described in accordance with an exemplary embodiment. Some components of the system of FIG. 6 may be distributed (not shown) and present on each node. They are responsible for monitoring and controlling the applications on the nodes. One or more instances of the system shown in FIG. 6 can be used to monitor multiple instances of the distributed components. The system of FIG. 6 may be described as a combination of three parts. One part comprises monitors 604, 606, and resource information gathering 608. A second part comprises hardware reconfigurators 610, application reconfigurators 612, and optimization response handler 614. A third part comprises a scheduler 616. Components 604, 606, and 608 collectively monitor, gather and analyze information on nodes, switches, clusters, applications running, etc. (602) as described in FIG. 5. The components 604, 606, and 608 provide this information to scheduler 616. The scheduler 616 is responsible for analyzing current system information and determining new parameters for reconfiguring various aspects of the system. It can move applications and reconfigure the network for optimal resource utilization. Components 610, 612, and 614 are collectively responsible for translating scheduler provided output (e.g., new application location and network topology information) into actual commands/operations that are responsible for reconfiguration. The system of FIG. 6 runs on one or more nodes (e.g., nodes 23A-23D in FIG. 2) in the network that it is managing.

Some control information may also be fed back from the reconfiguration part (i.e., components 610, 612, and 614) to the monitoring part (i.e., components 604, 606, and 608) as represented by a feedback arrow illustrated in FIG. 6.

The system of FIG. 6 may operate over various types of networks (e.g., a commonly assigned patent application Ser. No. 12/052,836, entitled, "METHOD, APPARATUS, AND COMPUTER PROGRAM PRODUCT FOR SCHEDULING WORK IN A STREAM-ORIENTED COMPUTER SYSTEM WITH CONFIGURABLE NETWORKS," filed concurrently herewith, the contents of which are incorporated by reference herein in its entirety. This disclosure summarizes one embodiment of a stream processing system that controls reconfigurable switches.

As described above, embodiments can be embodied in the form of computer-implemented processes and apparatuses for practicing those processes. In exemplary embodiments, the invention is embodied in computer program code executed by one or more network elements. Embodiments include computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. Embodiments include computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

What is claimed is:

1. A system for implementing stream processing, comprising:
    an application framework and applications containing dataflow graphs managed by the application framework running on a first network;
    at least one circuit switch in the first network having a configuration that is controlled by the application framework;
    a plurality of processing nodes interconnected by the first network over one of wireline and wireless links; and
    a second network configured to transmit control data to the first network, and to transfer additional data over the first network;
    wherein the application framework reconfigures circuit switches in response to monitoring aspects of the applications and the first network.

2. The system of claim 1, wherein the aspects of the applications being monitored include at least one of:
    CPU consumption;
    memory usage; and
    data flow rates.

3. The system of claim 1, wherein aspects of the first network being monitored include at least one of:
    CPU usage;
    bottlenecks; and
    network topology.

4. The system of claim 1, wherein the application framework further re-assigns work among the nodes in response to monitoring aspects of the applications and the first network.

5. The system of claim 1, wherein the first network comprises at least one packet switched and circuit switched components, and the application framework selects one of the packet switched and circuit switched components for data transfer at runtime based upon results of the monitoring.

6. The system of claim 1, wherein the application framework periodically reevaluates information derived from the monitoring and implements a decision to perform at least one of: re-assign work among the nodes, and reconfigure the circuit switches.

7. The system of claim 1, wherein the circuit switches are optical circuit switches.

8. The system of claim 1, wherein at least one of the nodes is used to host applications processing high bandwidth streaming data.

9. A method for implementing stream processing, comprising:
    managing a configuration of at least one circuit switch in a first network, the configuration managed by an application framework, the application framework and applications containing dataflow graphs that are managed by the application framework running on the first network;
    receiving, by a second network, control data and additional data over the first network, the first network comprising a plurality of processing nodes interconnected by the first network over one of wireline and wireless links;
    monitoring aspects of the applications and the first network; and
    reconfiguring circuit switches by the application framework in response to the monitoring.

10. The method of claim 9, wherein the aspects of the applications being monitored include at least one of:
    CPU consumption;
    memory usage; and
    data flow rates.

11. The method of claim 9, wherein aspects of the first network being monitored include at least one of:
    CPU usage;
    bottlenecks; and
    network topology.

12. The method of claim 9, wherein the application framework further re-assigns work among the nodes in response to monitoring aspects of the applications and the first network.

13. The method of claim 9, wherein the first network comprises at least one packet switched and circuit switched components, and the application framework selects one of the packet switched and circuit switched components for data transfer at runtime based upon results of the monitoring.

14. The method of claim 9, wherein the application framework periodically reevaluates information derived from the monitoring and implements a decision to perform at least one of: re-assign work among the nodes, and reconfigure the circuit switches.

15. The method of claim 9, wherein the circuit switches are optical circuit switches.

16. The method of claim 9, wherein at least one of the nodes is used to host applications processing high bandwidth streaming data.

17. A computer program product for implementing stream processing, the computer program product comprising:
- a non-transitory storage medium readable by a computer processor and storing instructions for execution by the computer processor for implementing a method, the method comprising:
- managing a configuration of at least one circuit switch in a first network, the configuration managed by an application framework, the application framework and applications containing dataflow graphs that are managed by the application framework running on the first network;
- receiving, by a second network, control data and additional data over the first network, the first network comprising a plurality of processing nodes interconnected by the first network over one of wireline and wireless links;
- monitoring aspects of the applications and the first network; and
- reconfiguring circuit switches by the application framework in response to the monitoring.

18. The computer program product of claim 17, wherein the aspects of the applications being monitored include at least one of:
CPU consumption;
memory usage; and
data flow rates.

19. The computer program product of claim 17, wherein aspects of the first network being monitored include at least one of:
CPU usage;
bottlenecks; and
network topology.

20. The computer program product of claim 17, wherein the application framework further re-assigns work among the nodes in response to monitoring aspects of the applications and the first network.

21. The computer program product of claim 17, wherein the first network comprises at least one packet switched and circuit switched components, and the application framework selects one of the packet switched and circuit switched components for data transfer at runtime based upon results of the monitoring.

22. The computer program product of claim 17, wherein the application framework periodically reevaluates information derived from the monitoring and implements a decision to perform at least one of: re-assign work among the nodes, and reconfigure the circuit switches.

23. The computer program product of claim 17, wherein the circuit switches are optical circuit switches.

24. The computer program product of claim 17 wherein at least one of the nodes is used to host applications processing high bandwidth streaming data.

* * * * *